(12) United States Patent
Kim et al.

(10) Patent No.: US 11,595,227 B2
(45) Date of Patent: Feb. 28, 2023

(54) ARTIFICIAL INTELLIGENCE DEVICE AND OPERATING METHOD THEREOF

(71) Applicant: LG ELECTRONICS INC., Seoul (KR)

(72) Inventors: Hyoeun Kim, Seoul (KR); Jaehong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 601 days.

(21) Appl. No.: 16/730,652

(22) Filed: Dec. 30, 2019

(65) Prior Publication Data

US 2021/0150307 A1    May 20, 2021

(30) Foreign Application Priority Data

Nov. 18, 2019 (KR) .................. 10-2019-0147284

(51) Int. Cl.
| | | |
|---|---|---|
| G06N 3/04 | (2006.01) | |
| G06N 3/08 | (2006.01) | |
| G06Q 10/06 | (2012.01) | |
| H04L 12/28 | (2006.01) | |

(52) U.S. Cl.
CPC .......... *H04L 12/2829* (2013.01); *G06N 3/08* (2013.01); *H04L 12/2803* (2013.01)

(58) Field of Classification Search
CPC ............. H04L 12/2829; H04L 12/2803; H04L 2012/285; G06N 3/08; G06Q 10/06311; G06Q 50/10
See application file for complete search history.

(56) References Cited

U.S. PATENT DOCUMENTS

2017/0070842 A1*  3/2017  Kulp ................. H04L 67/62

* cited by examiner

*Primary Examiner* — Charles R Kasenge
(74) *Attorney, Agent, or Firm* — Lee Hong Degerman Kang & Waimey (57) ABSTRACT

An artificial intelligence (AI) device may acquire user information, use information of a home appliance and weather information, acquire whether use of the home appliance is recommended and a recommended use time of the home appliance from the user information, the use information of the home appliance and the weather information, using an appliance use recommendation model, and output a recommendation comment indicating information on use of the home appliance based on the recommended use time.

12 Claims, 9 Drawing Sheets

| Cause 1 (Time) | Cause 2 (Weight) | Cause 3 | Cause 4 (Weight) | Cause 5 (minute) | Cause 6 (1/0) | Cause 7 (Yes/No) | Cause 8 | Label (Use/non-use) | Labeling data |
|---|---|---|---|---|---|---|---|---|---|
| 24 | 0.6/0.1/ 0.3 | Brosing | 0.6 | 20 | 1 | Yes | 10 | Use | Morning time |
| 98 | 0.3/0.7/ 0.2 | Brosing | 0.1 | 15 | 0 | Yes | 20 | Use | Afternoon time |
| 16 | 0.3/0.4/ 0.3 | SNS | 0.7 | 3 | 0 | No | 30 | Non-use | Null |
| 600 | 0.15/0.15/ 0.7 | Advertisement watching | 0.4 | 9 | 1 | Yes | 40 | Use | Evening time |
| 7 | 0.4/0.3/ 0.3 | Email | 0.6 | 25 | 0 | No | 50 | Non-use | Null |
| 167 | 0.1/0.8/ 0.1 | Music playing | 0.2 | 4 | 0 | Yes | 60 | Use | Afternoon time |

ARTIFICIAL INTELLIGENCE DEVICE AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2019-0147284, filed on Nov. 18, 2019, the contents of which are hereby incorporated by reference herein in its entirety.

FIELD

The present disclosure relates to an artificial intelligence (AI) device.

BACKGROUND

Recently, skin care devices for user's skin care, such as LED masks, or stylers for managing clothes have been released, in addition to existing home appliances such as TVs, washing machine, refrigerators, etc.

However, home appliances which are not daily necessaries, such as skin care devices, stylers, etc., are purchased at high prices but may fail to settle down in the user's existing lifestyle. Therefore, the frequency of use of such home appliances may be reduced and such home appliances may be frequently neglected.

When expensive home appliances which may fail to settle down in the user's existing lifestyle are neglected, cost loss may occur from the viewpoint of a user.

SUMMARY

An object of the present disclosure is to recognize a lifestyle, activity patterns, etc. of a user, provide a recommendation and managing service for use of home appliances which are not daily necessaries, and increase the frequency of use of the appliance.

An artificial intelligence (AI) device according to an embodiment of the present disclosure may acquire user information, use information of a home appliance and weather information, acquire whether use of the home appliance is recommended and a recommended use time of the home appliance from the user information, the use information of the home appliance and the weather information, using an appliance use recommendation model, and output a recommendation comment indicating information on use of the home appliance based on the recommended use time.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network may be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer if the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving device may include an actuator or a motor and may perform various physical operations such as moving a robot joint. In addition, a movable robot may include a wheel, a brake, a propeller, and the like in a driving device, and may travel on the ground through the driving device or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined path, and a technology for automatically setting and traveling a path if a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

In this case, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

Figure 1:
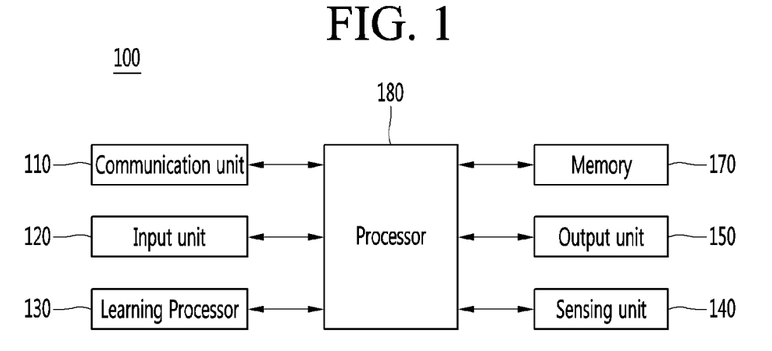
FIG. 1 illustrates an AI device according to an embodiment of the present disclosure.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing device 140, an output device 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

In this case, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used if an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

In this case, the learning processor 130 may perform AI processing together with the learning processor 240 of the AI server 200.

In this case, the learning processor 130 may include a memory integrated or implemented in the AI device 100. Alternatively, the learning processor 130 may be implemented by using the memory 170, an external memory directly connected to the AI device 100, or a memory held in an external device.

The sensing device 140 may acquire at least one of internal information about the AI device 100, ambient environment information about the AI device 100, and user information by using various sensors.

Examples of the sensors included in the sensing device 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output device 150 may generate an output related to a visual sense, an auditory sense, or a haptic sense.

In this case, the output device 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

If the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
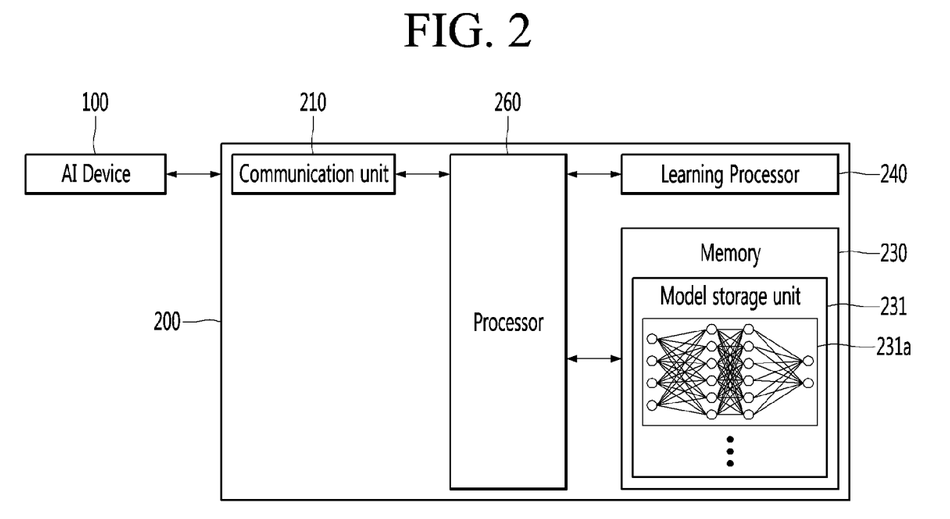
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. In this case, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 may transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 230.

The processor 260 may infer the result value for new input data by using the learning model and may generate a response or a control command based on the inferred result value.

Figure 3:
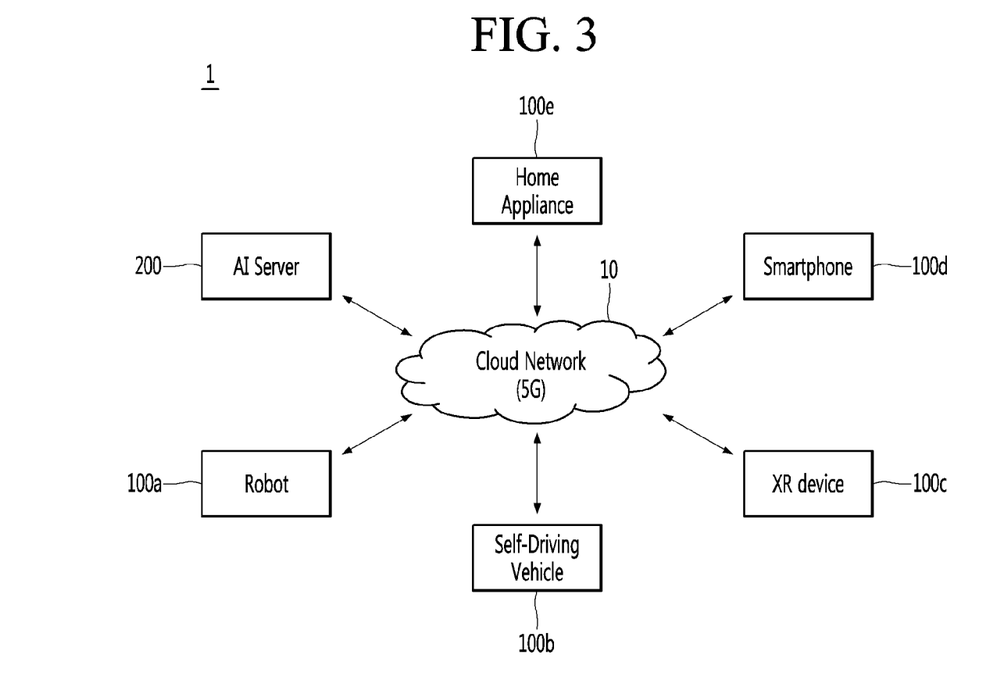
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

In other words, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, In other words, the robot 100a, the self-driving vehicle 100b, the XR device 100c, the smartphone 100d, or the home appliance 100e through the cloud network 10, and may assist at least part of AI processing of the connected AI devices 100a to 100e.

In this case, the AI server 200 may learn the artificial neural network according to the machine learning algorithm instead of the AI devices 100a to 100e, and may directly store the learning model or transmit the learning model to the AI devices 100a to 100e.

In this case, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the path and the travel plan, may determine the response to user interaction, or may determine the operation.

The robot 100a may use the sensor information acquired from at least one sensor among the lidar, the radar, and the camera so as to determine the travel path and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

In this case, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel path and the travel plan, and may control the driving device such that the robot 100a travels along the determined travel path and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving device based on the control/interaction of the user. In this case, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the path and the travel plan, or may determine the operation.

Like the robot 100a, the self-driving vehicle 100b may use the sensor information acquired from at least one sensor among the lidar, the radar, and the camera so as to determine the travel path and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

In this case, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel path and the travel plan, and may control the driving device such that the self-driving vehicle 100b travels along the determined travel path and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving device based on the control/interaction of the user. In this case, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

In this case, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel path or the travel plan. For example, the robot 100a and the self-driving vehicle 100b having the self-driving function may determine at least one of the travel path or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

In this case, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, if it is determined that the driver is in a drowsy state, the robot 100a may activate the self-driving function of the self-driving vehicle 100b or assist the control of the driving device of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot In other words subjected to control/interaction in an XR image. In this case, the robot 100a may be separated from the XR device 100c and interwork with each other.

If the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user may confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving vehicle 100b, to which the XR technology is applied, may refer to a self-driving vehicle having a means for providing an XR image or a self-driving vehicle In other words subjected to control/interaction in an XR image. Particularly, the self-driving vehicle 100b In other words subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

In this case, if the XR object is output to the HUD, at least part of the XR object may be outputted so as to overlap the actual object to which the passenger's gaze is directed. Meanwhile, if the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

If the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
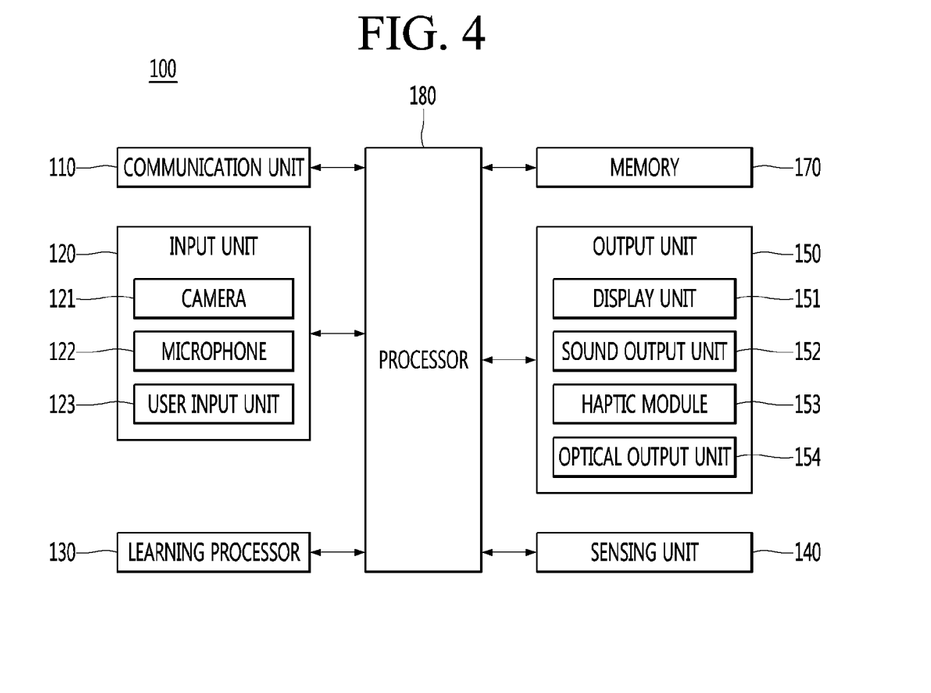
FIG. 4 illustrates an AI device according to another embodiment of the present disclosure.

FIG. 4 illustrates an AI device 100 according to an embodiment of the present disclosure.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video acquired by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and if information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The output device 150 may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user may feel. A representative example of a haptic effect that the haptic module 153 generates is vibration.

The optical output module 154 outputs a signal for notifying event occurrence by using light of a light source of the mobile terminal 100. An example of an event occurring in the AI device 100 includes message reception, call signal reception, missed calls, alarm, schedule notification, e-mail reception, and information reception through an application.

Figure 5:
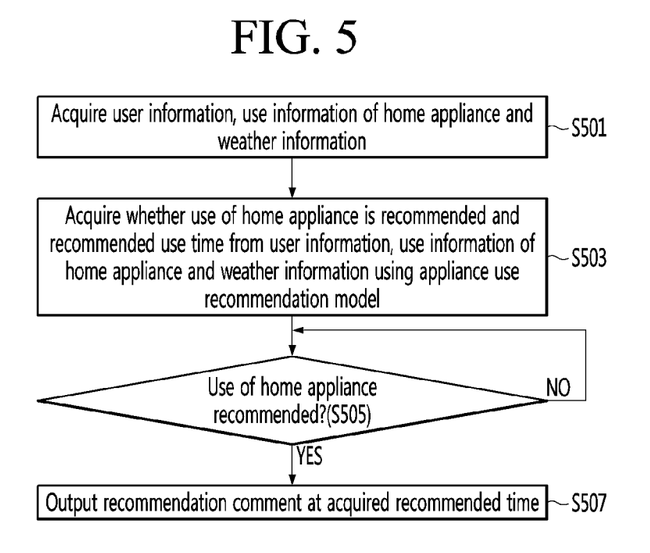
FIG. 5 is a flowchart illustrating a method of operating an AI device according to an embodiment of the present disclosure.

FIG. 5 is a flowchart illustrating a method of operating an AI device according to an embodiment of the present disclosure.

Referring to FIG. 5, the processor 180 of the artificial intelligence device 100 acquires user information, use information of a home appliance and weather information (S501).

The user information may include at least one of user identification information for identifying a user or activity information of the user.

The artificial intelligence device 100 may receive user information via a mobile terminal, such as a smartphone, of the user using a communication unit 110 (referred to as a communication interface).

The use information of the home appliance may include at least one of a non-use period of the home appliance or a use time of the home appliance.

The processor 180 may collect the use information of the home appliance from the home appliance via the communication interface 110.

The weather information may be information indicating the weather.

The weather information may be received from the AI server 200.

The processor 180 of the artificial intelligence device 100 acquires whether the use of the home appliance is recommended and a recommended use time of the home appliance from the user information, the use information of the home appliance and the weather information, using an appliance use recommendation model (S503).

The appliance use recommendation model may be an artificial neural network based model learned via a deep learning algorithm or a machine learning algorithm.

The appliance use recommendation model may be learned by any one of the learning processor 130 or the processor 180 of the artificial intelligence device 100 or the learning processor 240 or the processor 260 of the AI server 200.

When the appliance use recommendation model is learned by the AI server 200, the artificial intelligence device 100 may receive the appliance use recommendation model from the AI server 200, and install the appliance use recommendation model.

When the appliance use recommendation model is learned by the AI server 200, the AI server 200 may receive learning data necessary for learning from the home appliance or the mobile terminal of the user.

The appliance use recommendation model may be a model for recommending an optimized use method of an unused home appliance.

The appliance use recommendation model may be learned by supervised learning.

A training data set used to learn the appliance use recommendation model may include learning data including the user information, the use information of the home appliance and the weather information, and labeling data labeled in the learning data.

Learning of the appliance use recommendation model will be described with reference to the following drawings.

Figure 6:
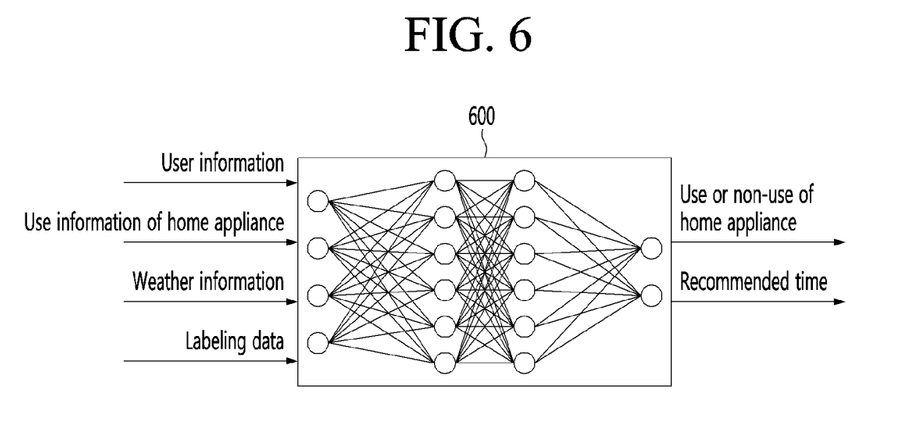
FIG. 6 is a view illustrating a learning process of an appliance use recommendation model according to an embodiment of the present disclosure.
Figure 7:
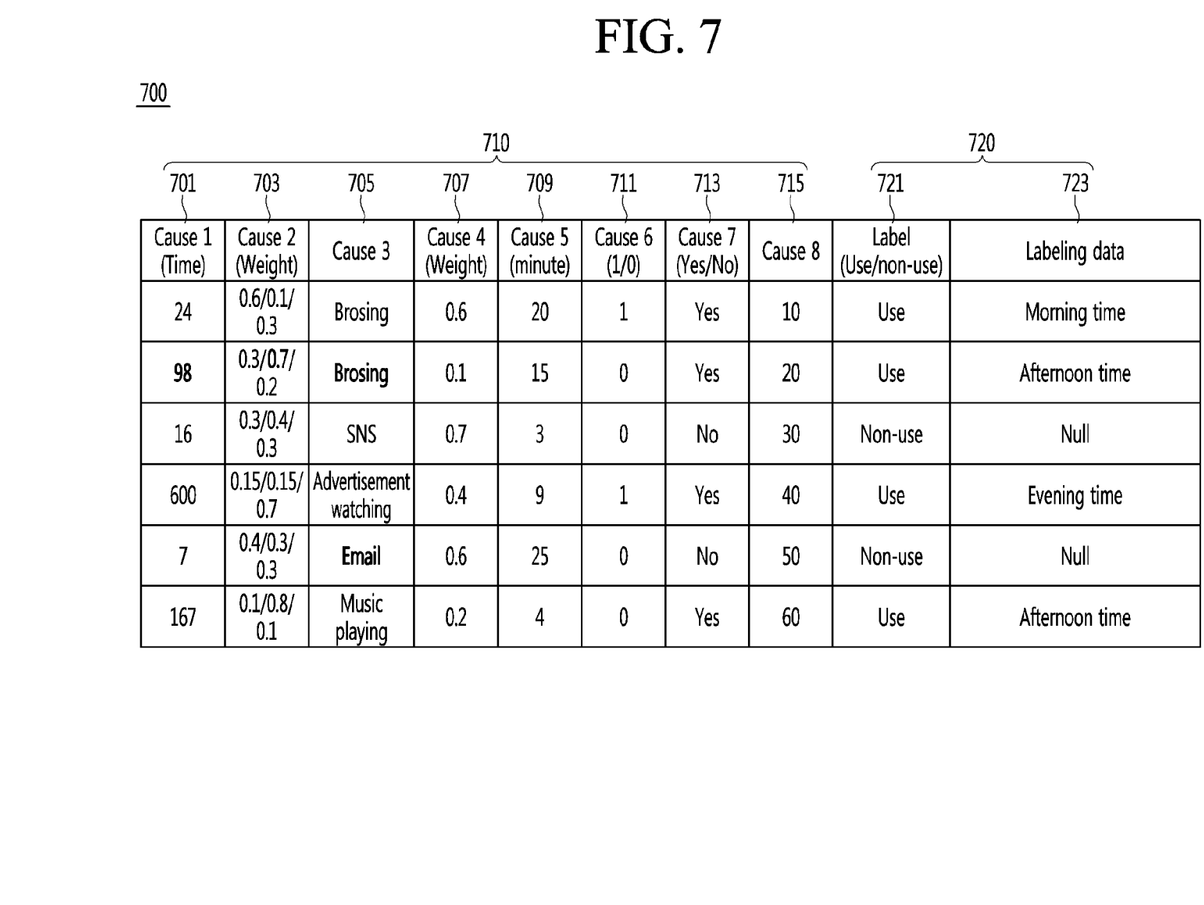
FIG. 7 is a view showing an example of a training data set used for learning of an appliance use recommendation model.

FIG. 6 is a view illustrating a learning process of an appliance use recommendation model according to an embodiment of the present disclosure, and FIG. 7 is a view showing an example of a training data set used for learning of an appliance use recommendation model.

Referring to FIG. 6, the appliance use recommendation model 600 composed of an artificial neural network is shown.

The training data set including learning data including the user information, the use information of the home appliance and the weather information, and the labeling data may be input to the appliance use recommendation model 600 as input data.

The labeling data may be correct answer data indicating whether the use of a home appliance is recommended and a recommended use time of the home appliance.

When an input feature vector is extracted from the input data and is input to the appliance use recommendation model 600, whether a home appliance is used and a recommendation comment as a result of inference may be output as a target feature vector.

The appliance use recommendation model 600 may be learned to minimize a cost function indicating a difference between the labeling data and the target feature vector.

Referring to FIG. 7, a training data set 700 used for the appliance use recommendation model 600 is shown.

The training data set may include learning data 710 and labeling data 720.

The learning data 710 may include a plurality of cause parameters 701 to 715.

The first cause parameter 701 may be data indicating the non-use period of the home appliance. The unit of the first cause parameter 701 may be a time.

The second cause parameter 703 may be data indicating the use time of the home appliance. The second cause parameter 703 may be divided into a morning time, an afternoon time and an evening time, and a weight may be given according to the frequency of use of each time.

Here, the morning time may be from 06:00 to 12:00, the afternoon time may be from 12:00 to 18:00, and the evening time may be from 18:00 to 24:00, but this is merely an example.

For example, a weight of 0.6 may be given to the morning time, a weight of 0.1 may be given to the afternoon time, and a weight of 0.3 may be given to the evening time, according to the frequency of use of the home appliance for each time.

The third cause parameter 705 may be data indicating the current activity of the user. The current activity of the user may be any one of web browsing through a smartphone, use of an SNS application through a smartphone, watching an advertisement through a smartphone, emailing through a smartphone or playing music through a smartphone.

The fourth cause parameter 707 is dependent on the third cause parameter 705 and may be data indicating a degree of utilization of a keypad.

As the degree of utilization of the keypad increases, the given weight may increase and, as the degree of utilization of the keypad decreases, the given weight may decrease.

The fifth cause parameter 709 is dependent on the third cause parameter 705 and may be data indicating the holding time of the current activity of the user. For example, the fifth cause parameter 709 may indicate any one of a time when the user performs web browsing, the use time of the SNS application, an advertisement watching time, an emailing time or a music playing time.

The fifth cause parameter 709 may be represented by minute.

The sixth cause parameter 711 is dependent on the third cause parameter 705 and may be data indicating whether information is uploaded via the SNS application or whether a messenger is used.

The value of the sixth parameter 711 may be 1 when information is uploaded or when the messenger is used and, otherwise, may be 0.

The seventh cause parameter 713 may be data indicating a user schedule. The seventh parameter 713 may be data reflecting the schedule stored in a calendar application installed in the smartphone of the user.

The value of the seventh cause parameter 713 may be YES (1) when there is a user's event during a specific period and may be NO (0) when there is no user's event during the specific period.

The eighth cause parameter 715 may be data indicating weather information. In particular, the eighth cause parameter 715 may be data indicating an UV index.

The labeling data 720 may include use labeling data 721 indicating whether the use of the home appliance is recommended and recommended time labeling data 723 indicating the recommended use time of the home appliance.

The use labeling data 721 is correct answer data and may indicate whether the use of the home appliance is recommended. The use labeling data 721 may have a value of 1 when the use of the home appliance is recommended and have a value of 0 when the use of the home appliance is not recommended.

The recommended time labeling data 723 may be any one of a morning time, an afternoon time or an evening time.

Here, the morning time may be from 06:00 to 12:00, the afternoon time may be from 12:00 to 18:00, and the evening time may be from 18:00 to 24:00.

The appliance use recommendation model 600 may be a model subjected to supervised learning via the training data set 700 to infer the recommended use time of the home appliance.

The value of each parameter configuring the learning data 710 may be normalized with a probability between 0 and 1.

FIG. 5 will be described again.

The processor 180 of the artificial intelligence device 100 determines whether the use of the home appliance is recommended via the output of the appliance use recommendation model (S505).

When the use of the home appliance is recommended, the processor 180 of the artificial intelligence device 100 outputs a recommendation comment for recommending the use of the home appliance at the acquired recommended time via the output unit 150 (S507).

The recommendation comment may be generated by some of a plurality of cause parameters.

Specifically, each of the plurality of cause parameters may be classified as any one of an independent cause parameter or a dependent cause parameter.

For example, each of the first cause parameter 701, the second cause parameter 703, the seventh cause parameter 713 and the eighth cause parameter 715 among the plurality of cause parameters shown in FIG. 7 may be an independent cause parameter affecting the recommendation comment.

In addition, each of the third cause parameter 705, the fourth cause parameter 707, the fifth cause parameter 709 and the sixth cause parameter 711 may be a dependent cause parameter which does not affect the recommendation comment.

The processor 180 may determine the recommendation comment guiding recommendation for the use of the home appliance from the plurality of independent cause parameters, using a recommendation comment inference model.

The recommendation comment inference model may be an artificial neural network based model learned by a causality relation learning algorithm.

An artificial neural network model used in the causality relation learning algorithm may be Bayesian graphical model which is a known model.

The causality relation learning algorithm may provide recommendation information suitable for a specific result using a plurality of cause parameters affecting the specific result.

The causality relation learning algorithm may be an example of supervised learning.

Figure 8:
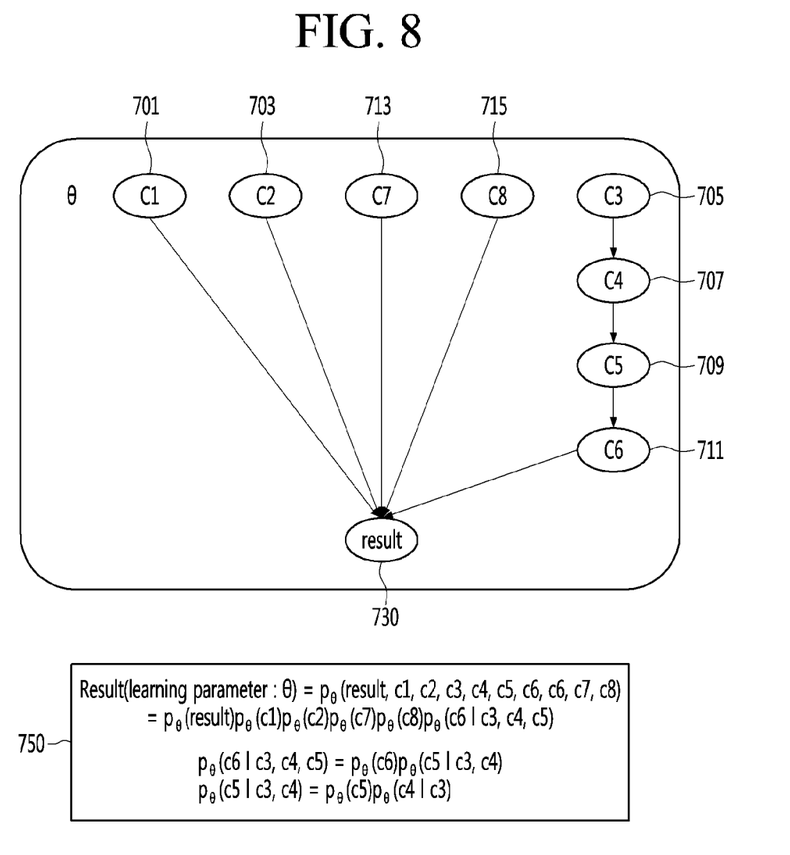
FIGS. 8 and 9 are views illustrating a process of a causality relation learning algorithm according to an embodiment of the present disclosure.
Figure 9:
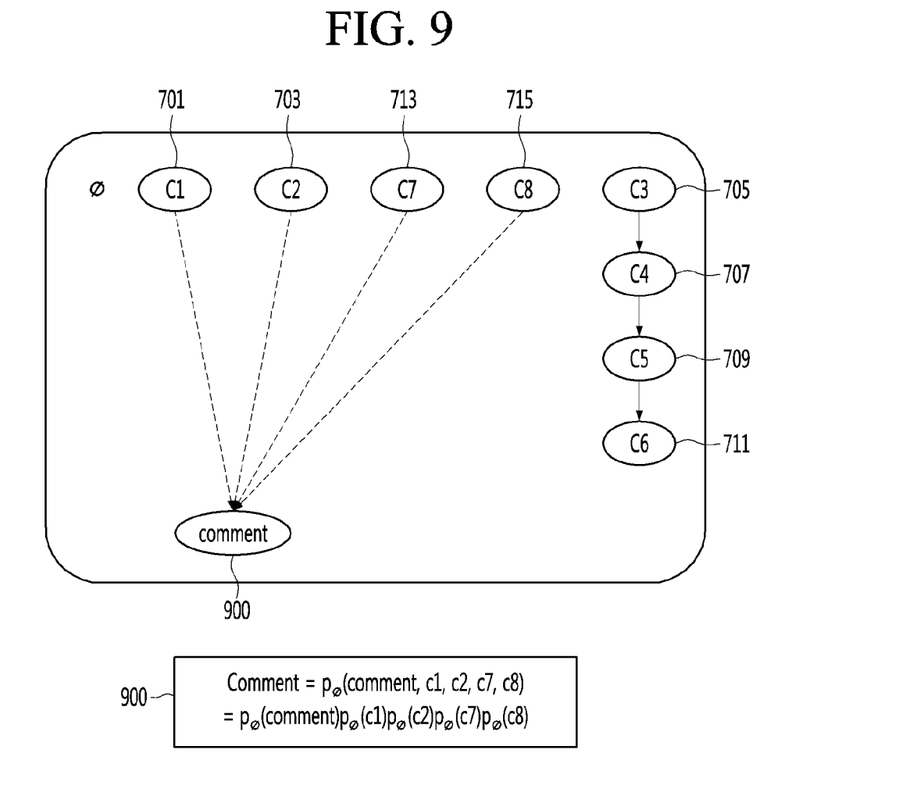

FIGS. 8 and 9 are views illustrating a process of a causality relation learning algorithm according to an embodiment of the present disclosure.

In FIGS. 8 and 9, each of the first cause parameter 701, the second cause parameter 703, the seventh cause parameter 713 and the eighth cause parameter 715 may be an independent cause parameter affecting the recommendation comment.

In addition, each of the third cause parameter 705, the fourth cause parameter 707, the fifth cause parameter 709 and the sixth cause parameter 711 may be a dependent cause parameter which does not affect the recommendation comment.

Referring to FIG. 8, the recommendation comment inference model may derive a result parameter 730 via the plurality of cause parameters 701 to 715.

The probability of the result parameter 730 may be obtained via calculation of a conditional probability via a first equation 750.

The result parameter 730 may indicate the recommended use time of the home appliance.

Referring to FIG. 9, the recommendation comment inference model may acquire a recommendation comment parameter 900 using the independent cause parameters 701 to 715 among the plurality of cause parameters 701 to 715.

That is, the probability of the recommendation comment parameter 900 may be obtained via a second equation 900 of FIG. 2.

The recommendation comment parameter 900 may be determined based on the frequency of use of the home appliance, the time of use, schedule information of the user and weather information.

The recommendation comment parameter 900 may recommend a comment related to the use of the home appliance.

Figure 10:
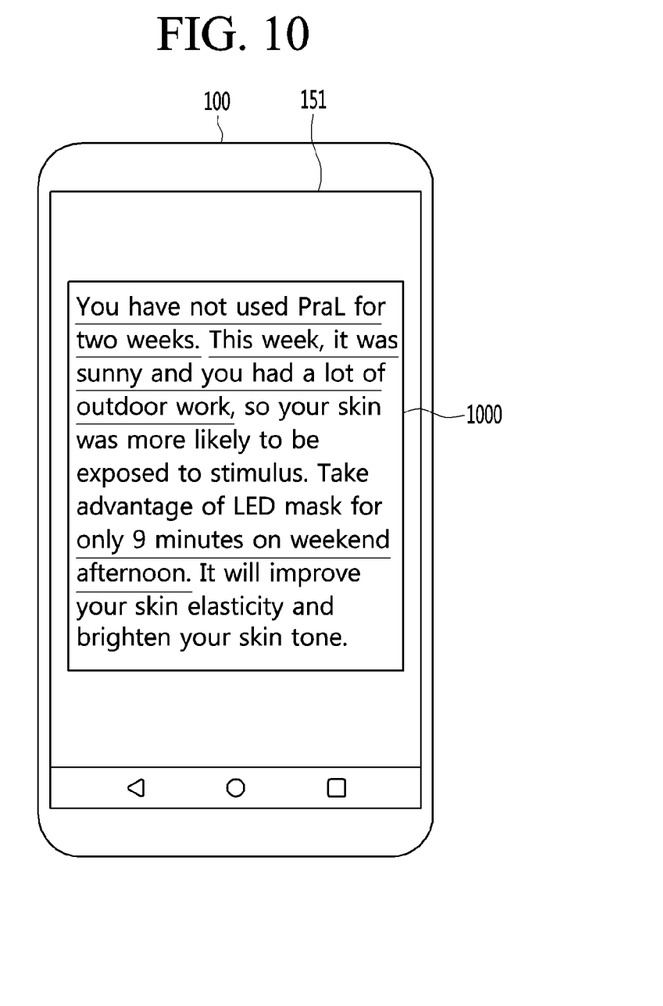
FIGS. 10 and 11 are views showing examples of recommendation comment according to an embodiment of the present disclosure.
Figure 11:
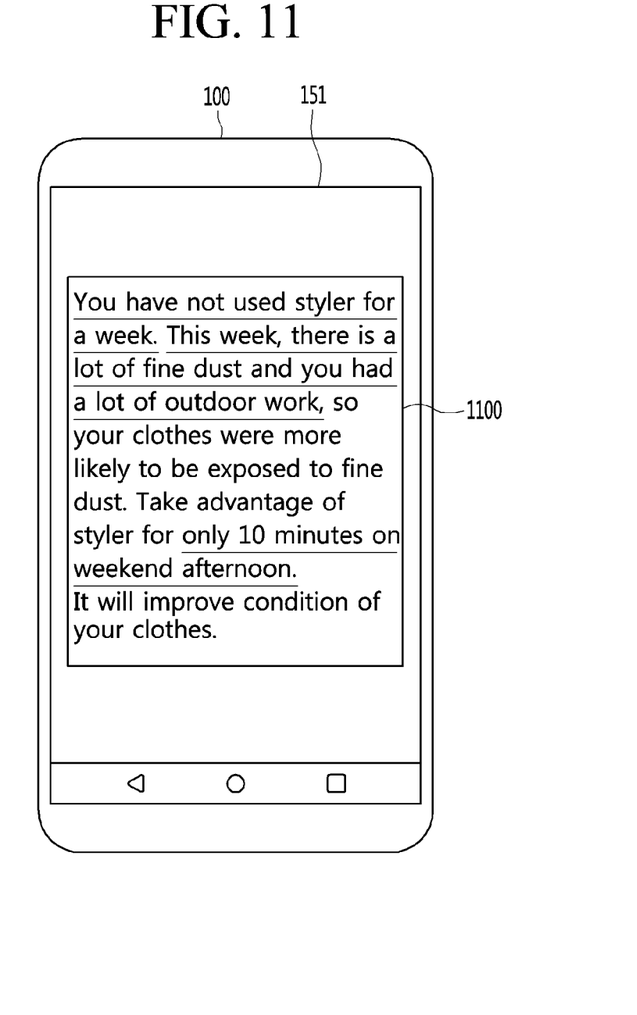

FIGS. 10 and 11 are views showing examples of recommendation comment according to an embodiment of the present disclosure.

Assume that the home appliance is an LED mask for facial skin care of a user in FIG. 10 and the home appliance is a styler for managing the clothes of the user in FIG. 11.

The LED mask may periodically transmit information on the frequency of use and the time of use to the artificial intelligence device 100.

Similarly, the styler may periodically transmit information on the frequency of use and the time of use to the artificial intelligence device 100.

FIG. 10 shows an example of a recommendation comment 1000 output via the display unit 151 of the artificial intelligence device 100 according to the embodiment of the present disclosure.

The recommendation comment 1000 may be generated based on the frequency of use of the LED, the time of use, a user schedule and weather information.

That is, the recommendation comment 1000 may include a recommended use time of the LED mask and a recommended use period based on the non-use period of the LED mask, a time of use, a user schedule and weather information.

Although an example of displaying the recommendation comment 1000 via the display unit 151 in the form of push notification is described in FIG. 10, the present disclosure is not limited thereto and the recommendation comment may be audibly output via the sound output module 152 such as the speaker.

The recommendation comment 1100 of FIG. 11 may be generated based on the non-use period of the styler, a time of use, a user schedule and weather information.

According to the embodiment of the present disclosure, the degree of utilization of the home appliance may increase according to the recommendation comment on the use of the home appliance neglected by the user.

In addition, skin care or cloth management of the user may be efficiently performed according to utilization of the neglected home appliance.

The present disclosure may also be embodied as computer readable codes on a medium having a program recorded thereon. The computer readable medium is any data storage device that may store data which may be thereafter read by a computer system. Examples of the computer readable medium include HDD (Hard Disk Drive), SSD (Solid State Disk), SDD (Silicon Disk Drive), ROM, RAM, CD-ROM, a magnetic tape, a floppy disk, an optical data storage device, or the like. In addition, the computer may include the processor 180 of the AI device.

What is claimed is:

1. An artificial intelligence (AI) device comprising:
   a memory configured to store an appliance use recommendation model, wherein the appliance use recommendation model is an artificial intelligence network based model subjected to supervised learning by a deep learning algorithm or a machine learning algorithm;
   a communication interface configured to perform communication with a home appliance; and
   a processor configured to:
   acquire user information including information on current activity of a user and schedule information of the user, use information of the home appliance and weather information,
   acquire whether use of the home appliance is recommended and a recommended use time of the home appliance from the user information, the use information of the home appliance and the weather information, using the appliance use recommendation model, and
   output a recommendation comment indicating information on use of the home appliance based on the recommended use time,
   wherein a training data set used for the appliance use recommendation model includes data representing information on current activity of the user, the data representing information on current activity of the user includes a task being performed through a smartphone, a data indicating a degree of utilization of a keypad of the smartphone and a data indicating a holding time of the current activity of the user.

2. The AI device of claim 1,
wherein the recommended use time includes a morning time, an afternoon time and an evening time, and
wherein the processor is configured to output the recommendation comment inducing the use of the home appliance at any one of the morning time, the afternoon time or the evening time.

3. The AI device of claim 1,
wherein the use information of the home appliance includes a non-use period of the home appliance and a use time of the home appliance.

4. The AI device of claim 3, wherein the processor is configured to acquire the recommendation comment based on the non-use period of the home appliance, the use time of the home appliance, the schedule information and the weather information.

5. The AI device of claim 4, wherein the recommendation comment includes the recommended use time of the home appliance and a use period of the home appliance.

6. The AI device of claim 1, wherein the processor is configured to:
receive the use information of the home appliance from the home appliance,
receive the user information from a mobile terminal of a user, and
receive the weather information from an external server.

7. A method of operating an artificial intelligence (AI) device, the method comprising:
acquiring user information, use information of a home appliance and weather information;
acquiring whether use of the home appliance is recommended and a recommended use time of the home appliance from the user information, the use information of the home appliance and the weather information, using an appliance use recommendation model, wherein the appliance use recommendation model is an artificial intelligence network based model subjected to supervised learning by a deep learning algorithm or a machine learning algorithm; and
outputting a recommendation comment indicating information on use of the home appliance based on the recommended use time,
wherein a training data set used for the appliance use recommendation model includes data representing information on current activity of the user,
the data representing information on current activity of the user includes a task being performed through a smartphone, a data indicating a degree of utilization of a keypad of the smartphone and a data indicating a holding time of the current activity of the user.

8. The method of claim 7,
wherein the recommended use time includes a morning time, an afternoon time and an evening time, and
wherein the outputting of the recommendation comment includes outputting the recommendation comment inducing the use of the home appliance at any one of the morning time, the afternoon time or the evening time.

9. The method of claim 7,
wherein the user information includes information on current activity of a user and schedule information of the user, and
wherein the use information of the home appliance includes a non-use period of the home appliance and a use time of the home appliance.

10. The method of claim 9, further comprising acquiring the recommendation comment based on the non-use period of the home appliance, the use time of the home appliance, the schedule information and the weather information.

11. The method of claim 10, wherein the recommendation comment includes the recommended use time of the home appliance and a use period of the home appliance.

12. The method of claim 7, further comprising:
receiving the use information of the home appliance from the home appliance;
receiving the user information from a mobile terminal of a user; and
receiving the weather information from an external server.

* * * * *